United States Patent
de Jong et al.

(10) Patent No.: US 8,850,300 B1
(45) Date of Patent: Sep. 30, 2014

(54) PACKET COMMUNICATION TESTING APPARATUS AND ASSOCIATED METHODS

(75) Inventors: Lambertus de Jong, Wantage (GB); James Tyson, Burnham Slough (GB)

(73) Assignee: Altera Corporation, San Jose, CA (US)

( * ) Notice: Subject to any disclaimer, the term of this patent is extended or adjusted under 35 U.S.C. 154(b) by 287 days.

(21) Appl. No.: 12/908,529

(22) Filed: Oct. 20, 2010

(51) Int. Cl.
*G06F 11/00* (2006.01)

(52) U.S. Cl.
USPC .............................. 714/821; 714/712; 714/43

(58) Field of Classification Search
USPC .................... 714/43, 712, 715, 716, 821, 824; 370/248
See application file for complete search history.

(56) References Cited

U.S. PATENT DOCUMENTS

| | | | |
|---|---|---|---|
| 6,049,530 A * | 4/2000 | Petersen et al. | 370/248 |
| 6,363,056 B1 * | 3/2002 | Beigi et al. | 370/252 |
| 6,424,629 B1 * | 7/2002 | Rubino et al. | 370/241.1 |
| 7,661,030 B2 * | 2/2010 | Bozak et al. | 714/25 |
| 7,760,656 B1 * | 7/2010 | Yuan et al. | 370/242 |
| 7,840,841 B2 * | 11/2010 | Huang et al. | 714/25 |
| 7,904,758 B2 * | 3/2011 | Seh | 714/43 |
| 8,238,254 B2 * | 8/2012 | Meloche | 370/241 |
| 2006/0072538 A1 * | 4/2006 | Raith | 370/349 |
| 2007/0174728 A1 * | 7/2007 | Kritayakirana et al. | 714/43 |
| 2007/0248020 A1 * | 10/2007 | Hoque et al. | 370/249 |
| 2008/0304420 A1 * | 12/2008 | Deragon et al. | 370/249 |
| 2009/0168657 A1 * | 7/2009 | Puri et al. | 370/248 |
| 2010/0008237 A1 * | 1/2010 | Olgaard et al. | 370/249 |
| 2011/0103235 A1 * | 5/2011 | Luong et al. | 370/245 |

* cited by examiner

*Primary Examiner* — Joshua Lohn
(74) *Attorney, Agent, or Firm* — Law Offices of Maximilian R. Peterson

(57) ABSTRACT

A system includes a packet generator and a packet checker. The packet generator is operable to operable to generate a packet for transmission to a destination device. The packet includes a plurality of fields, including a code field that is operable to store a code generated based on an expected modification to the packet during transmission. The packet checker is associated with the destination device and is operable to receive the packet.

20 Claims, 5 Drawing Sheets

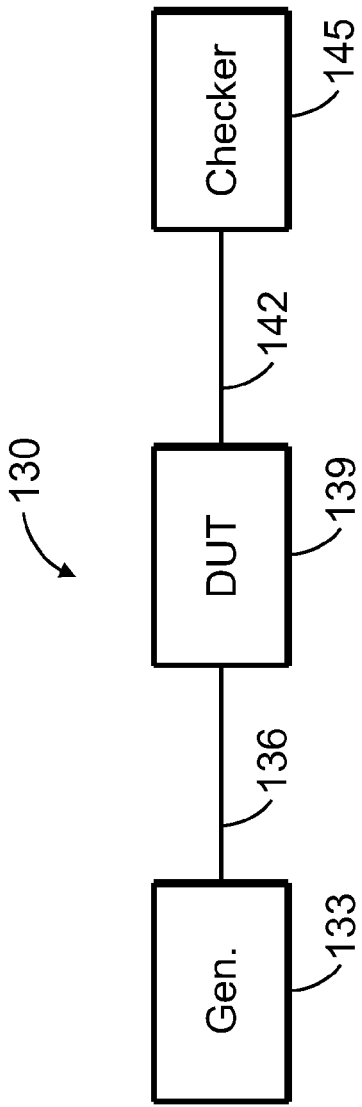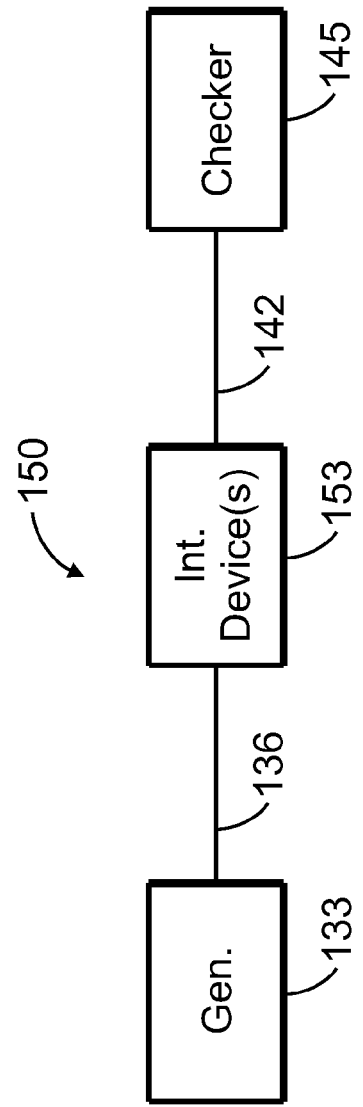

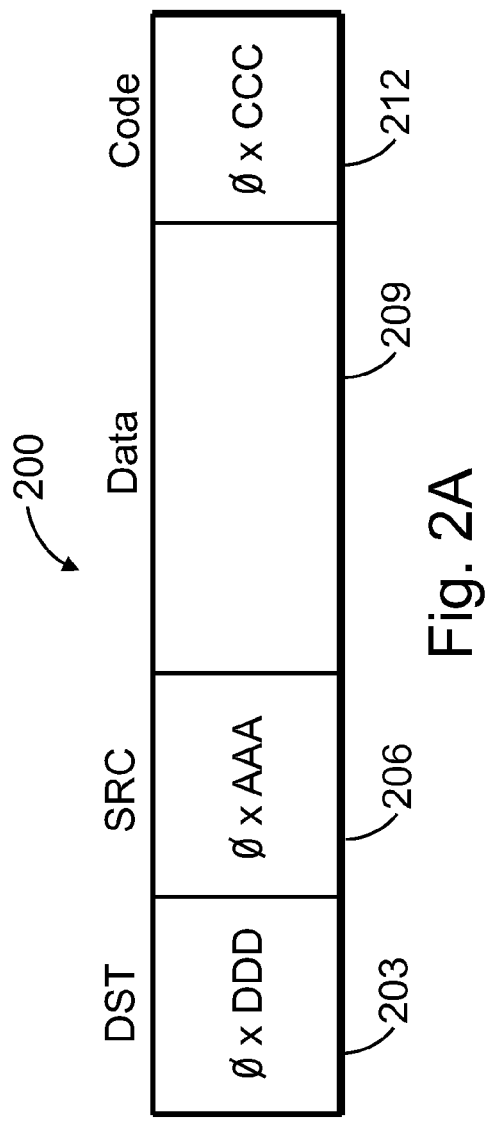
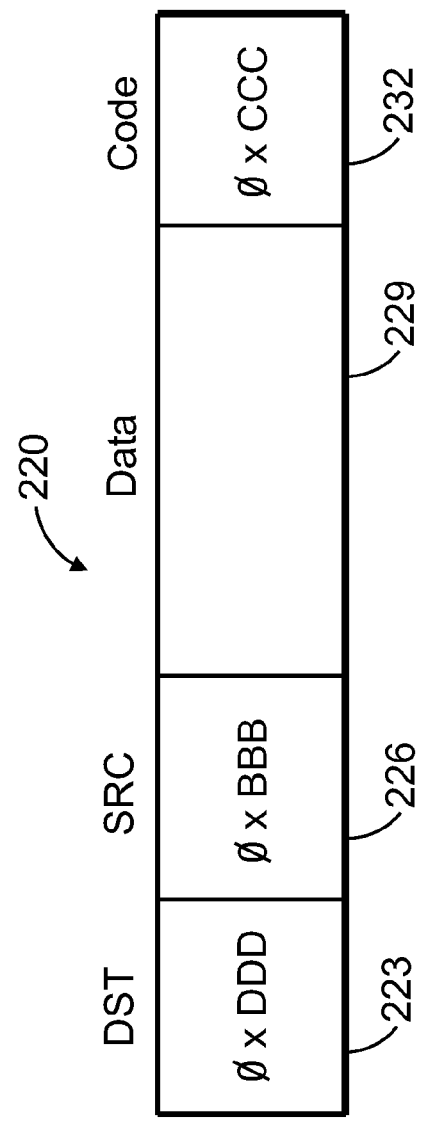
Fig. 2A
Fig. 2B

PACKET COMMUNICATION TESTING APPARATUS AND ASSOCIATED METHODS

TECHNICAL FIELD

The disclosed concepts relate generally to communication apparatus and related techniques and, more particularly, to apparatus for testing packet processing systems/apparatus, and associated methods.

BACKGROUND

Modern communication systems and apparatus commonly use packets. In other words, rather than the circuit-switched systems in relatively wide use previously, present-day communication systems increasingly use packet-switched techniques, i.e., packet-processing techniques.

Packet-processing systems typically include some mechanism for testing the packets. For example, some systems embed or add a cyclic redundancy code (CRC) or checksum to a packet for testing purposes. Testing increases the reliability of the packet transmission and reception. Thus, testing ultimately increases the reliability and robustness of the communication system. In a conventional scheme, the packet has several fields, including a destination field, a source field, a data field, and a cyclic redundancy check (CRC) field. The CRC field typically includes a CRC value for all the fields in the packet as it exists before transmission and without regard to the transmission channel, destination, etc.

SUMMARY

In one exemplary embodiment, a system includes a packet generator and a packet checker. The packet generator is operable to operable to generate a packet for transmission to a destination device. The packet includes a plurality of fields, including a code field that is operable to store a code generated based on an expected modification to the packet during transmission. The packet checker is associated with the destination device and is operable to receive the packet.

In another exemplary embodiment, an apparatus includes a code generator that generates a code for inclusion in a packet. The code is generated by taking into account changes to the packet during transit from a packet source to a packet destination. In yet another exemplary embodiment, a method of communicating a packet from a source to a destination via a packet path includes obtaining a characteristic of the packet path, and generating a code depending on the characteristic of the packet path. The method further includes including the code in the packet.

BRIEF DESCRIPTION OF THE DRAWINGS

The appended drawings illustrate only exemplary embodiments and therefore should not be considered as limiting its scope. Persons of ordinary skill in the art who have the benefit of this disclosure appreciate that the disclosed concepts lend themselves to other equally effective embodiments. In the drawings, the same numeral designators used in more than one drawing denote the same, similar, or equivalent functionality, components, or blocks.

FIG. 1A depicts a block diagram of a system according to an exemplary embodiment.

FIG. 1B illustrates a block diagram of a system according to another exemplary embodiment.

FIG. 2A depicts a packet according to an exemplary embodiment.

FIG. 2B shows another packet according to an exemplary embodiment.

DETAILED DESCRIPTION

Figure 3:
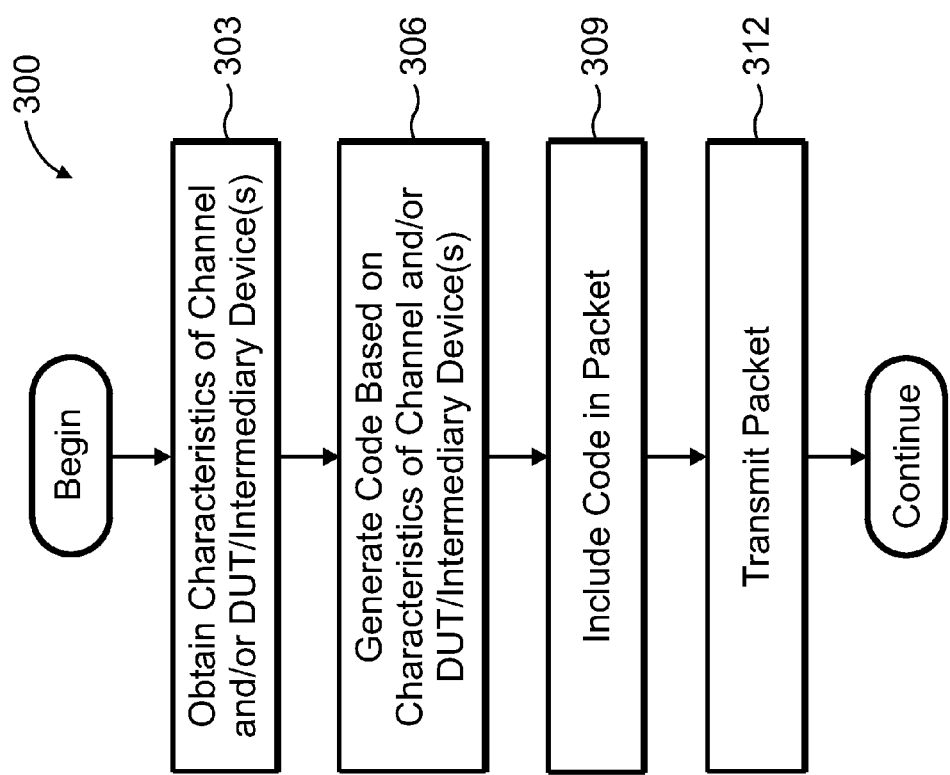
FIG. 3 depicts a flow diagram for a method of processing packets according to an exemplary embodiment.

The disclosed concepts relate generally to packet-processing systems. More specifically, the disclosed concepts provide apparatus and methods for testing packet-processing systems. The testing has application in communication systems, in testing systems, in design and development environments, in research and development environments, etc. Of course, as persons of ordinary skill in the art who have the benefit of the description of the disclosed concepts understand, one may use the disclosed concepts in other contexts and applications, as desired.

Exemplary embodiments according to the disclosed concepts take into account the packet's path, for example, one or more device, or apparatus, and/or link or channel that can modify or cause change to the packet. The embodiments include a code or code field used to confirm or verify proper system operation, proper device operation, proper communication of packets, etc. Thus, the code or code field of the packet, as transmitted from a source, takes into account any changes to the packet that might occur during transit via the packet path from the source to the destination.

By doing so, exemplary embodiments provide the benefit of supplying a correct code field or value at the destination, i.e., a code field or value that accounts for changes to the packet while in transit. Such code fields or values provide more reliable packet-based communication and, thus, more reliable and robust systems that include packet-based communication or packet processing.

Several mechanisms might give rise to packet changes while in transit in the packet path. For example, an intervening or intermediary device between the packet's source and ultimate destination might change the packet by substituting its own address in the packet's address field. As another example, an intervening or intermediary device might modify the data field of the packet.

A variety of techniques or schemes may be used to generate the code values or code fields for inclusion in the packets according to exemplary embodiments. Examples include CRC, parity, checksum, cryptographic hashes, error-detecting and/or error-correcting codes (e.g., Reed Solomon), and the like. The choice of code depends on a variety of factors, such as system or device specifications, the degree of error detection or error correction desired, the amount of hardware and/or software overhead tolerable or possible, etc.

FIG. 1A depicts a block diagram of a system 130 according to an exemplary embodiment. Specifically, system 130 allows the testing of a device, e.g., device under test (DUT), by using one or more packets. System 130 includes a generator or source 133 of packets, one or more DUTs 139, and a destination or checker 145 of packets. Thus, the packet path includes link 136, DUT(s) 139, and link 142.

Generator 133 generates one or more packets and transmits the generated packets to checker 145 via DUT(s) 139. Specifically, generator 133 may transmit the packet(s) to DUT(s) 139 via link 136. DUT(s) 139 in turn transmits the packet(s)

to checker 145 via link 142. Checker 145 checks or examines the packet(s) to verify the operation of DUT(s) 139.

The generated packets may be modified by DUT(s) 139 during their transmission from generator 133 to checker 145 via a packet path. Accordingly, one or more portions, e.g., fields, of the packet(s) may be modified. Furthermore, the generated packet may similarly be modified by other parts of system 130, e.g., links 136 and/or 142, routers, switches, etc.

Generator 133 accounts for changes to the packet(s) in the code values that are included or encoded in the code field(s) of the packet(s). Specifically, generator 133 generates the code values of the packet(s) based not only on the original contents of the packet(s) but also based on the changes that the packet(s) will experience during transit from generator 133 to checker 145, i.e., in the packet path. In some exemplary embodiments, changes to the packets may be accounted for in a priori fashion.

Checker 145 receives the packet(s) via link 142. Checker 145 may calculate a code value associated with the received packets. Checker 145 may determine whether the DUT, link(s) 136 and 142, etc., have operated as expected, as desired, etc. by comparing the calculated code to the code(s) included in the packet(s) code field(s).

FIG. 1B illustrates a block diagram of a system 150 according to another exemplary embodiment. System 150 allows verification or confirmation of the operation of one or more devices and/or links in the path of packet(s).

System 150 includes a generator or source 133 of packets, one or more intervening or intermediary devices 153, and a destination or checker 145 of packets. The packet path includes link 136, intervening or intermediary device(s) 153, and link 142.

Generator 133 generates one or more packets similar to that of FIG. 1A. The generated packets are transmitted to checker 145 via intervening or intermediary device(s) 153. Specifically, generator 133 transmits the packet(s) to intervening or intermediary device(s) 153 via link 136. Intervening or intermediary device(s) 153 in turn transmits the packet(s) to checker 145 via link 142. Checker 145 checks or examines the packet(s) to determine verification of the operation of one or more parts of system 150, e.g., intervening or intermediary device(s) 153.

Note that intervening or intermediary device(s) 153 might modify the contents of the packet(s) while they are in transit from generator 133 to checker 145. As noted above, the modifications to the packets might change one or more parts of the packet(s). Furthermore, other parts of system 150 (for example, links 136 and/or 142) might modify the packet, for example, via routers, switches, or other devices (not shown explicitly).

Generator 133 takes into account those changes to the packet(s), and accounts for them in the code values encoded or included in the code field(s) of the packet(s). Specifically, generator 133 generates the code values of the packet(s) based not only on the original contents of the packet(s) but also on the changes that the packet(s) will experience during transit from generator 133 to checker 145. Put another way, generator 133 accounts for expected changes to the packet(s) during transit of the packet, for example, via the packet(s) path(s), and generates or calculates code value(s) for the packet(s) based at least in part on the expected changes. The generated or calculated code value(s) are encoded within the respective packet(s), for example, in code field(s) 212.

Checker 145 receives the packet(s) via link 142, and calculates a code value for each packet. By comparing the calculated code to the code(s) included in the code field(s) of the packet(s), checker 145 can determine the correct operation of the intervening or intermediary device(s) 153, link(s) 136 and 142, etc., as desired.

Generator 133 and checker 145 may be implemented in a variety of different ways. For example, general-purpose logic (gates, registers, etc.), special-purpose, custom logic, field-programmable gate arrays (FPGAs), finite-state machines (FSMs), processors, microprocessors, etc., may be used. According to one embodiment, programs, software, algorithms, etc. on a general-purpose or special-purpose computer device or computer system, etc., may be used.

Links 136 and 142 may include any transmission means serving as a coupling mechanism. For example, links 136 and 142 may include buses, wires, cables, optical fibers, etc. The choice of links may depend on a variety of factors. For example, the link choice may depend on specifications associated with one or more devices in system 150, the type of communication or functionality desired, etc.

A variety of packet formats and structures may be used in exemplary embodiments according to the disclosed concepts (for example, the systems illustrated in FIG. 1A and FIG. 1B. As merely one example, the packet(s) may be Ethernet packets. Format of the generated packets may vary based on application, data paths, etc. Referring now to FIGS. 2A-2B exemplary formats associated with generated packets are shown.

FIG. 2A depicts a packet 200 according to an exemplary embodiment. According to one embodiment, packet 200 is a packet generated by the generator 133 and transmitted subsequent thereto. Packet 200 includes a destination field 203 (denoted as "DST"), a source field 206 (denoted as "SRC"), data field 209, and code field 212.

Data field 209 may be the payload and includes desired data to be transmitted via packet 200. For example, data filed 209 may include digital communication data, speech data, video data, etc.

Destination field 203 is associated with the address of the destination, e.g., the address of the checker 145. For example, in an Ethernet network, destination field 203 may include the address of a device that packet 200 is intended for. In this exemplary embodiment, the address associated with the destination device may be "0xDDD" (hexadecimal value "DDD"). Thus, packet 200 includes a destination address "0xDDD" in its destination field.

Similarly, source field 206 is associated the address for the source of packet 200. The example packet shown in FIG. 2A shows the address as generally "0xAAA" (hexadecimal value "AAA"). As noted above, one or more devices, for example, routers, switches, and the like, may modify the source address of packet 200, i.e., source field 206. Thus, the value in source field 206 may change during the transit of packet 200 form its original (or subsequent or intervening) source to its destination.

In one embodiment, code field 212 may include a code value that accounts for the changes that packet 200 experiences during its transmission from the source to the destination. In this example, code field 212 includes the generated code value "0xCCC," which accounts for the changes to one or more fields (e.g., source field 203) of packet 200 during its transmission from the source to the destination.

Note that more than one device or mechanism may alter one or more fields of packet 200. Regardless of the cause or mechanism of the change(s), the code value in code field 212 accounts for those changes. Put another way, the code value in code field 212 reflects a correct code value if one calculates a code value that takes into account changes that are expected to occur to or in packet 200 during transmission.

FIG. 2B shows a packet 220 according to an exemplary embodiment. Packet 220 may constitute a packet that a destination or checker (see, for example, FIGS. 1A-1B) receives.

Similar to packet 200 (see FIG. 2A), packet 220 includes a destination field 223 (denoted as "DST"), a source field 226 (denoted as "SRC"), data field 229, and code field 232. Data field 209 may include any desired data that one wishes to transport, as described above.

Destination field 203 includes the address for the destination of packet 220. In a typical situation, destination field 203 of packet 220 has the same value as does destination field of packet 200 (see FIG. 2A) although, depending on the type of network or protocol or communication scheme, the destination might change during transit. The example packet shown in FIG. 2B shows the address as generally "0xDDD" (hexadecimal value "DDD").

Source field 226 includes the address for the source of packet 220. The example packet shown in FIG. 2B shows the address as generally "0xBBB" (hexadecimal value "BBB"). Thus, the value in source field 226 indicates a change of the source address in packet 220 when compared to packet 200 (see FIG. 2A).

Referring to packet 220 in FIG. 2B, code field 212 includes a code value that, as described above, takes into account the changes that packet 220 experiences while in transport from the source to the destination. Depending on whether packet 220 has experienced any undesirable or unexpected changes while in transit, the code value in code field 232 of packet 220 in FIG. 2B might differ from the code value in code field 212 of packet 200 in FIG. 2A.

A checker or other device or a component of the destination device may calculate a code value associated with packet 220. The checker may compare the calculated value to the code value in code field 232 of the received packet 200. Depending on the results of the comparison, the checker may determine whether packet 220 has experienced any undesirable or unexpected change (e.g., whether a DUT has performed as expected, i.e., correctly, or incorrectly).

In the example shown, code field 232 of packet 220 in FIG. 2B includes the code value "0xCCC," the same value as code field 212 of packet 200 of FIG. 2A. Thus, if a checker calculates a code value of "0xCCC" for packet 220, one may conclude that packet 220 has experienced expected changes (if any) and, hence, that the DUT(s) have performed properly, etc.

FIG. 3 depicts a flow diagram 300 for a method of processing packets according to an exemplary embodiment. At 303, characteristics of the channel or packet path (e.g., links 136 and 142) and/or DUT(s) or intervening or intermediary device(s) is determined. At 306, a code is generated based on the characteristics of the packet path or channel, e.g., channel/link and/or DUT(s) or intervening or intermediary device(s).

At 309, the code is included or encoded in a code field of a packet. Subsequently, at 312, the packet is transmitted to its respective destination. At the destination, a code is calculated and compared to the code value included in the packet. Depending on the results of the comparison (whether the codes are the same), it can be determined whether the path from the source to the destination has affected the packet in an expected or correct manner or not. For example, one may determine whether one or more DUT(s), links, etc., operated correctly or as expected.

One aspect of the disclosed concepts relates to simulation of various packet-processing apparatus, systems, subsystems, etc. Specifically, one may use the packet-processing techniques to implement methods or algorithms on a computing device or system for logic simulation.

Figure 4:
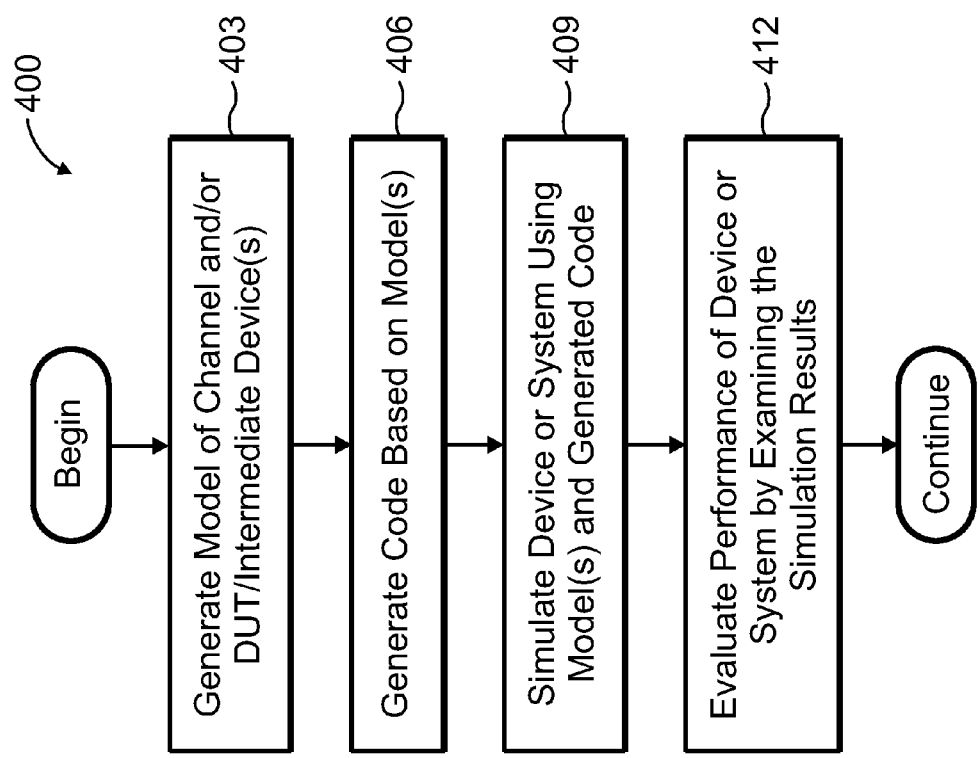
FIG. 4 illustrates a flow diagram for a method of performing simulation according to an exemplary embodiment.

FIG. 4 illustrates a flow diagram 400 for a method of performing simulation according to an exemplary embodiment. At 403, a simulation model of the channel and/or the DUT(s) or intervening or intermediary device(s) that are located between a source and a destination is generated. At 406, a code (or a packet, including a code field) is generated based on the model.

At 409, the device or system is simulated, using the simulation model of the system and the generated code. The simulated model of the system may cause changes the code, based on the characteristics of the system, e.g., how the system modifies or calculates data, etc. At 412, the performance of the system is evaluated by examining the simulation results. More specifically, by examining the value of the code after it has been processed by the simulated system, one may determine whether the system performed as expected or correctly.

Figure 5:
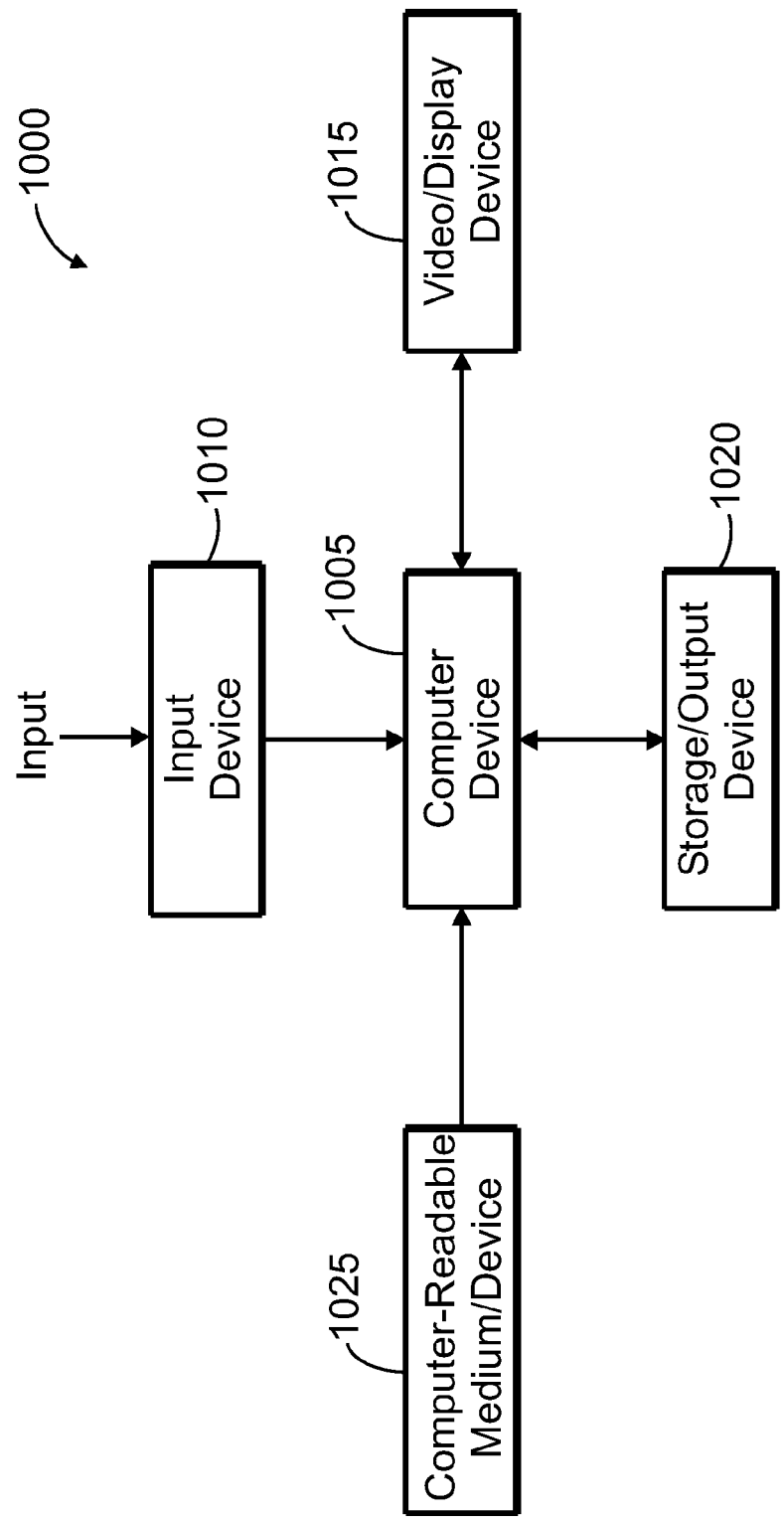
FIG. 5 depicts a block diagram of an exemplary system for processing information or data according to the disclosed concepts.

A computer system, a device, a processor, a controller, etc., may perform, run, or execute the disclosed algorithms, methods, or software in accordance with embodiments of the present invention. FIG. 5 shows a block diagram of an exemplary system 1000 for processing information according to exemplary embodiments of the disclosed concepts. System 1000 includes a computer device 1005, an input device 1010, a video/display device 1015, and a storage/output device 1020, although one may include more than one of each of those devices, as desired.

Computer device 1005 couples to input device 1010, video/display device 1015, and storage/output device 1020. System 1000 may include more than one computer device 1005, for example, a set of associated computer devices or systems, as desired.

Typically, system 1000 operates in association with input from a user. The user input typically causes system 1000 to perform specific desired information-processing tasks, including the tasks described above, such as packet processing, packet-processing apparatus testing, packet-testing, etc. System 1000 in part uses computer device 1005 to perform those tasks. Computer device 1005 includes information-processing circuitry, such as a processor, a central-processing unit (CPU), a controller, a microcontroller, etc., although one may use more than one such device or information-processing circuitry, as persons skilled in the art would understand.

Input device 1010 receives input from the user and makes that input available to computer device 1005 for processing. The user input may include data, instructions, etc. Input device 1010 may constitute an alphanumeric input device (e.g., a keyboard), a pointing device (e.g., a mouse, rollerball, light pen, touch-sensitive apparatus, for example, a touch-sensitive display, or tablet), or both. The user operates the alphanumeric keyboard to provide text, such as ASCII characters, to computer device 1005. Similarly, the user operates the pointing device to provide cursor position or control information to computer device 1005.

Video/display device 1015 displays visual images to the user. Video/display device 1015 may include graphics circuitry, such as graphics processors, as desired. The visual images may include information about the operation of computer device 1005, such as graphs, pictures, images, and text. Video/display device 1015 may include a computer monitor or display, a projection device, and the like, as persons of ordinary skill in the art would understand. If system 1000 uses a touch-sensitive display, the display may also operate to provide user input to computer device 1005.

Storage/output device 1020 allows computer device 1005 to store information for additional processing or later retrieval (e.g., softcopy), to present information in various forms (e.g., hardcopy), or both. As an example, storage/output device 1020 may include a magnetic, optical, semiconductor, or magneto-optical drive capable of storing information on a desired medium and in a desired format. As another example, storage/output device 1020 may constitute a printer, plotter, or other output device to generate printed or plotted expressions of the information from computer device 1005.

Computer-readable medium 1025 interrelates structurally and functionally to computer device 1005. Computer-readable medium 1025 stores, encodes, records, and/or embodies functional descriptive material. By way of illustration, the functional descriptive material may include computer programs, computer code, computer applications, and/or information structures (e.g., data structures or file systems). When stored, encoded, recorded, and/or embodied by computer-readable medium 1025, the functional descriptive material imparts functionality. The functional descriptive material interrelates to computer-readable medium 1025.

Information structures within the functional descriptive material define structural and functional interrelations between the information structures and computer-readable medium 1025 and/or other aspects of system 1000. These interrelations permit the realization of the information structures' functionality.

Moreover, within such functional descriptive material, computer programs define structural and functional interrelations between the computer programs and computer-readable medium 1025 and other aspects of system 1000. These interrelations permit the realization of the computer programs' functionality. Thus, in a general sense, computer-readable medium 1025 includes information, such as instructions, that when executed by computer device 1005, cause computer device 1005 (system 1000, generally) to provide the functionality prescribed by a computer program, software, method, algorithm, etc., as included (partially or entirely) in computer-readable medium 1025.

By way of illustration, computer device 1005 reads, accesses, or copies functional descriptive material into a computer memory (not shown explicitly in the figure) of computer device 1005. Computer device 1005 performs operations in response to the material present in the computer memory. Computer device 1005 may perform the operations of processing a computer application that causes computer device 1005 to perform additional operations. Accordingly, the functional descriptive material exhibits a functional interrelation with the way computer device 1005 executes processes and performs operations.

Furthermore, computer-readable medium 1025 constitutes an apparatus from which computer device 1005 may access computer information, programs, code, and/or applications. Computer device 1005 may process the information, programs, code, and/or applications that cause computer device 1005 to perform additional or desired tasks or operations.

Note that one may implement computer-readable medium 1025 in a variety of ways, as persons of ordinary skill in the art would understand. For example, memory within computer device 1005 may constitute a computer-readable medium 1025, as desired.

Alternatively, computer-readable medium 1025 may include a set of associated, interrelated, coupled (e.g., through conductors, fibers, etc.), or networked computer-readable media, for example, when computer device 1005 receives the functional descriptive material from a network of computer devices or information-processing systems. Note that computer device 1005 may receive the functional descriptive material from computer-readable medium 1025, the network, or both, as desired.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation, as persons of ordinary skill in the art who have the benefit of the description of this disclosure understand. Other modifications and alternative embodiments in addition to those described here will be apparent to persons of ordinary skill in the art who have the benefit of this disclosure. Accordingly, this description teaches those skilled in the art the manner of carrying out the disclosed concepts, and is to be construed as illustrative only.

The forms and embodiments shown and described should be taken as illustrative embodiments. Persons skilled in the art may make various changes in the shape, size and arrangement of parts without departing from the scope of the disclosed concepts in this document. For example, persons skilled in the art may substitute equivalent elements for the elements illustrated and described here.

Moreover, persons skilled in the art who have the benefit of this disclosure may use certain features of the disclosed concepts independently of the use of other features, without departing from the scope of the disclosed concepts.

The invention claimed is:

1. A system, comprising:
a packet generator operable to generate a packet for transmission to a destination device, wherein the packet comprises a plurality of fields, including a code field operable to store a first code generated based on an expected modification to the packet during transmission; and
a packet checker associated with the destination device operable to receive the packet.

2. The system according to claim 1, wherein a device under test (DUT) causes the expected modification to the packet.

3. The system according to claim 1, wherein an intermediary device between the packet generator and the packet checker causes the expected modification to the packet.

4. The system according to claim 2, wherein the device modifies the packet by modifying a source field of the packet.

5. The system according to claim 1, wherein the packet checker calculates a second code for the packet, and compares the calculated code to the first code.

6. The system according to claim 1, wherein the code comprises cyclic redundancy check (CRC).

7. The system according to claim 1, wherein the code comprises an error detection or error correction code.

8. The system according to claim 3, wherein the device comprises a router.

9. The system according to claim 3, wherein the device comprises a switch.

10. The system according to claim 1, wherein the packet comprises an Ethernet packet.

11. An apparatus, comprising a code generator that generates a code for inclusion in a packet to be transmitted from a packet source to a packet destination via a path, wherein the code is generated by taking into account expected changes to the packet during transit from the packet source to the packet destination via the path, wherein the code is included in a code field of the packet.

12. The apparatus according to claim 11, wherein the packet comprises a code field.

13. The apparatus according to claim 12, wherein the code is encoded in the code field of the packet.

14. The apparatus according to claim 11, wherein the code comprises an error detection or error correction code.

15. The apparatus according to claim 11, further comprising a packet checker coupled to receive the packet at the destination.

16. The apparatus according to claim 15, wherein the packet checker calculates a received packet code for the received packet and compares the received packet code to the code included in the packet.

17. A method of communicating a packet from a source to a destination via a packet path, the method comprising:
- obtaining a characteristic of the packet path that is expected to modify the packet during communication from the source to the destination;
- generating a code depending on the characteristic of the packet path; and
- including the code in the packet.

18. The method according to claim 17, wherein the characteristic of the packet path comprises a change made to a field of the packet during transit.

19. The method according to claim 17, further comprising:
- receiving the packet at the destination;
- calculating a code for the packet; and
- comparing the calculated code to the code included in the packet.

20. The method according to claim 17, wherein the code comprises an error detection code.

* * * * *